United States Patent [19]

Furukawa et al.

[11] 4,438,213
[45] Mar. 20, 1984

[54] MAGNETIC HEAD SLIDER MATERIAL AND METHOD FOR PRODUCING THE SAME

[75] Inventors: Mitsuhiki Furukawa; Michito Miyahara; Takashi Kitahira; Kiyohito Misumi; Masaharu Shiroyama, all of Fukuoka; Toshiaki Wada, Osaka, all of Japan

[73] Assignees: Nippon Tungsten Co., Ltd., Fukuoka; Sumitomo Special Metals Co., Ltd., Osaka, both of Japan

[21] Appl. No.: 413,311

[22] Filed: Aug. 31, 1982

[30] Foreign Application Priority Data

Aug. 31, 1981 [JP] Japan .................................. 56-137358

[51] Int. Cl.³ ........................ C04B 35/56; C04B 35/58
[52] U.S. Cl. ..................................................... 501/92
[58] Field of Search ....................... 501/92; 252/62.56; 360/122

[56] References Cited

U.S. PATENT DOCUMENTS 2,412,374 12/1946 Wejnarth ............................... 501/92
3,036,017 5/1962 Schrewelius ......................... 501/92
4,016,313 4/1977 Shcrewelius ......................... 501/92
4,251,841 2/1981 Jacobs ................................... 501/87

Primary Examiner—Mark Bell
Attorney, Agent, or Firm—Jordan and Hamburg

[57] ABSTRACT

Magnetic head slider material consisting of 5~10 percent by weight of silicon, 1.3~7.8 percent by weight of tungsten silicide and essentially balanced silicon carbide. And it is method for producing said magnetic head slider material that at the time of which the mixed powder consisting of silicon carbide, carbon and tungsten is sintered, cellulose is also mixed with said mixed powder and sintered together at the same time. And then fibrous micropores are caused to the sintered body by the above-described sintering, after that molten metallic silicon infiltrated into fibrous micropores.

1 Claim, 2 Drawing Figures

MAGNETIC HEAD SLIDER MATERIAL AND METHOD FOR PRODUCING THE SAME

BACKGROUND OF THE INVENTION

This invention relates to magnetic head slider material and method for producing the same. It has been generally used polycrystal Ni-Zn, Mn-Zn ferrite, single crystal Mn-Zn ferrite or high-hardness Permalloy for recording and reproduction magnetic head such as computer, audiovisualaids or VTR, etc.

Then lately, it is firmly required high densibility of the recording density and the improvement of resistance to wear. From these reasons, the thin film magnetic head slider material is going to be advanced at present days. And also, with improving the thin film magnetic head slider, it is going to be selected individual materials which have satisfied the required properties of magnetic sircuit part material for recording reproduction, slider or wear resistant part material. That is to say, it is considered that the following two mentiones are desirable.

Thin films such as Permalloy or Sendust having excellent magnetic properties in a high frequency range are used for magnetic sircuit part material. And also, aluminum-base, carbide-base material is used for wear resistant part material.

As the above-mentioned wear resistant part material, Al$_2$O$_3$-TiC base material such as disclosed in U.S. Pat. No. 4,251,841, issued Feb. 17, 1981 to Walter G. Jacobs is depicted. Al$_2$O$_3$-TiC base material has low porosity, and is excellent in view of resistance to wear, but it is not always stable material in view of familiarity with recording medium and lubricity. Especially in the case of thin film recording medium such as plating medium or sputtering medium, there are some problems as follows.

The thickness of these medium becomes thinner, and it is required to fix lubricating protective film to these mediums. And also, in soft ferrite which have been used for a long time so far, its hardness indicates Hv 600~800. On the contrary in depicted Al$_2$O$_3$-TiC base material of the above-mentioned publication, its hardness indicates Hv 1900~2100. Therefore, Al$_2$O$_3$-TiC base material has some difficulties for applying depending on the kind of recording mediums.

SUMMARY OF THE INVENTION

It is an object of the present invention to provide magnetic head slider material and method for producing it which are satisfied the required properties such as excellent familiarity with recording medium and lubricity. Accordingly, the gist of the material in accordance with the present invention is as follows.

Magnetic head slider material consists of 5~10 percent by weight of silicon, 1.3~7.8 percent by weight of tungsten silicide and essentially balanced silicon carbide. The present material is produced as following process. At the time of which mixed powder consisting of silicon carbide, carbon and tungsten is sintered, cellulose is also mixed with said mixed powder and sintered together at the same time. And then fibrous micropores are caused to the sintered body by the above-mentioned sintering, and after that, molten metallic silicon infiltrates into fibrous micropores.

DETAILED DESCRIPTION OF THE PREFERRED EMBODIMENTS

Figure 1:
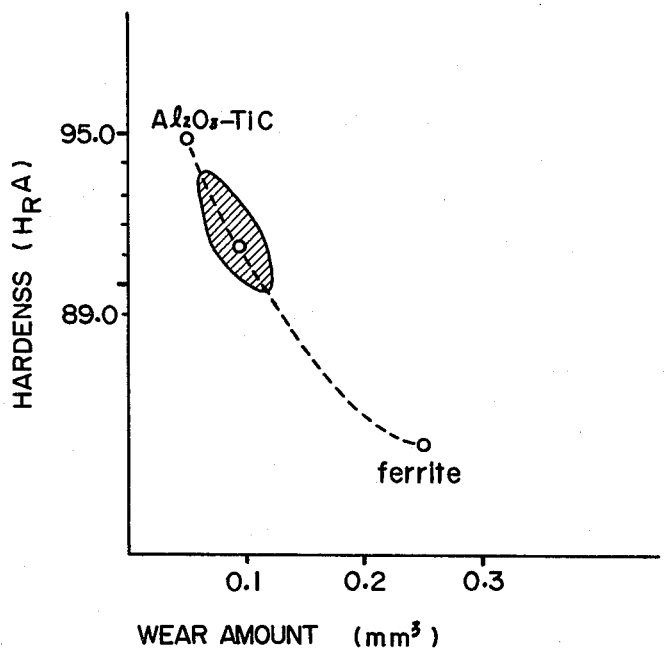
FIG. 1 shows a graph, indicating the relations with the wear amount and the hardness of various materials

The material of the present invention having excellent familiarity with recording medium and lubricity consists of 5~10 percent by weight of silicon, 1.3~7.8 percent by weight of tungsten silicide and essentially balanced silicon carbide. And also method for producing magnetic head slider material comprising the following steps:

(1) preparing the green compact by molding a raw material mixture which contains (a) 100 parts by weight, conisting of 60~80 percent by weight of silicon carbide power, and balanced carbon powder, (2) 2~10 parts by weight of tungsten powder, and (c) 1~5 parts by weight of cellulose (2) preparing said green compact by heating in non-oxidizing atmosphere to produce the sintered body, and (3) subjecting molten metallic silicon to said sintered body for infiltrating.

In method for producing the present material, it is possible to get much more excellent material by further providing Hot Isostatic Pressing (HIP) treatment after the above-mentioned process. In this invention, WSi$_2$ is added for the purpose of the improvement of resistance to oxidation of SiC formed body. However, such effects are not observed much in less than 1.3 percent by weight of WSi$_2$, on the other way, resistance to oxidation is lowered by the difference of thermal expansion with SiC in more than 7.8 percent by weight of WSi$_2$.

As to addition of Si, minute SiC formed body is not obtained in less than 5 percent by weight of Si, and small-sized pores are caused on the surface at the time of which SiC formed body was polished. And also, in the case of more than 10 percent by weight of Si, there are still problems in the view of resistance to corrosion and its strength. Furthermore, clean surface is hardly obtained because of the difference of the hardness of SiC phase and Si phase at the time of which SiC formed body was polished. Meanwhile, in a method for producing SiC-WSi$_2$-Si formed body, it is considered that the range of 60~80 percent by weight of SiC and 40~20 percent by weight of C are suitable mixing ratio of SiC and C. Even if the mixing ratio was out of the above-identified ranges, the improvement of resistance to oxidation is observed by adding WSi$_2$, however, the strength is less remarkable. From those reasons, it is inapplicable as magnetic head slider material.

As SiC base sintered body having excellent oxidation resistance and minutability, SiC-WSi$_2$-Si and SiC-MoSi$_2$-Si have the same properties and producing methods. The sintering by the HIP method is required that its temperature indicates over 1300° C. and its pressure indicates 500 Kg/cm$^2$. As the reason of mentioned above, it is considered that immature reaction part of SiC-C-Si is improved such more by high temperature and high pressure. Additionally, at the time of which the mixed form consisting of SiC, W and C is produced, minute crystal cellulose are contaminated to said mixed form uniformly at the same time and are formed. At the time of presintering, fibrous micropores of a range of 0.3~1 μm is regularly controlled. Presintered body having such minute pores is quite good for injecting fused Si inside of the presintered body. The osmotic rate of said fused Si becomes over several times compared with the presintered body produced by conventional method, and it will be possible to get SiC base sintered body having section thickness and high-density at a short time. Moreover, uniform sintered body in the point of the quality of material is obtained in the surface layer part and the inner part of SiC base sintered body. It is no necessary to eliminate the surface layer part after reacted sintering such as SiC base sintered body produced by conventional method. Minute crystal cellulose which is used for causing fibrous micropores inside of SiC base presintered body is mainly comprised plant cellular membrane such as lumber, cotton or flax. In that constitution, it is good to use minute crystal cellulose of which molecules are arranged regularly in parallel. Especially, it is much better to use minute crystal ellulose which is made of high-purity refinery pulp because it is effective to prevent for contaminating the impurity after sintering. And also there are further effects that adding minute crystal cellulose causes micropores, from that fact injecting Si does not only become easier, but also at the time of which SiC-W-C mixed powder is pressured and shaped at a room temperature, added minute crystal cellulose is easily entangled with particles, and it is related with excellent formability of the powder compact. Therefore, the above-mentioned minute crystal cellulose will be possible to produce the complicated form body. Moreover, it is remarkably effective in view of homogeneity of magnetic head slider material. In the case of producing high-density SiC base sintered body, SiC-W-C green compact is required to be made high-density green compact as much as possible. At that time, the present addition has large effect, and indicates the largest effect in 1~5 parts by weight of cellulose. The experiment related to achieving the present invention and its results are as follows.

αSiC powder having 70 percent by weight and a mean particle size of 9 μm, Carbon-black having 30 percent by weight and a mean particle size of 0.01 μm, cellulose having 1 part by weight and W powder having 4 parts by weight and a mean particle size of 2 μm were mixed, wax was added to the mixture, and then said mixture was granulated. Subsequently, the powder added wax was shaped at a pressure of 1000 Kg/cm² to 30×10×5 mm, and then such shaped bodies were presintered at 700° C. in a vacuum. 10 g of Si metal was set on said presintered compact, heated up to 1500° C. for 1 hour under 0.1~0.5 torr of reduced pressure, and then reacting sintered with retainning 3 hours. Values of material properties as to such sintered body (88.5 SiC-7Si-4.5WSi$_2$) are identified to the following Table.

| each properties of the material | |
| --- | --- |
| specific gravity | over 3.05 |
| hardness | H$_R$A over 91.0 |
| transverse rupture strength | over 40Kg/mm² |
| thermal conductivity | 0.143cal/cm Sec.°C. |
| electrical resistivity | 50Ω.cm |

Secondly, a test piece of aluminum oxide material (70Al$_2$O$_3$-30TiC) and a test piece of the present material (88.5SiC-7Si-4.5WSi$_2$) were fixed by pulley of 10 Kg weight, and evaluated time requires to cut in 50 mm by a resinoid-bonded diamond wheel. As the results of cutting test, it was possible to cut in 40 of time requires for 100 of alumina base material.

The above-mentioned results are identified that the present material have dominant properties in the point of its machinability as magnetic head slider material in spite of head material. Next, SiC-WSi$_2$-Si formed body of the present invention was shaped to 2×4 mm sectional length and 20 mm rectangle by a diamond wheel, and its one side edge was formed to accute angle edge. Furthermore, wear test by pin-disk method was performed, and its process is as follows.

Figure 2:
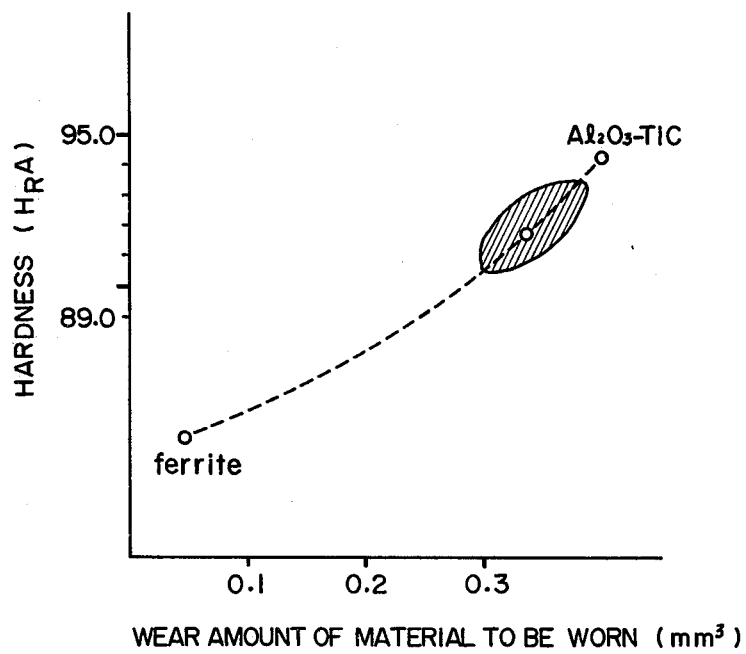
FIG. 2 shows a graph, indicating the relations with the wear amount and the hardness of ferrite of which the material to be worn in wear test by various materials.

Disk type ferrite with 45 mm in outside diameter, 10 mm in internal diameter and 10 mm thickness was used for this test. Accute angle edge of SiC-WSi$_2$-Si formed body of the present invention was touched directly to the ferrite which is combined with a sintered body of the present invention and rotated. Accordingly, at the time of the above-mentioned test, wear test was done by conventional Mn-Zn polycrystal ferrite material (32MnO-15-ZnO$_2$-52Fe$_2$O$_3$) and Al$_2$O$_3$-TiC base material, and its results are shown in FIG. 1 and FIG. 2. Namely, FIG. 1 shows the relation with wear resistance and hardness, and FIG. 2 shows the relation with wear amount of material to be worn and hardness. And also, the shaped part in both Figures equal to the values of each properties of the present material. As proved in FIG. 1 and FIG. 2, the present material have its hardness a little to Al$_2$O$_3$-TiC base material between conventional ferrite material and aforesaid Al$_2$O$_3$-TiC base material. Therefore the present material have excellent properties such as a high order of familiarity with recording medium and labricity, and also is the best suited material as the thin film recording medium.

What we claim is:

1. Magnetic head slider material consisting of 5~10 percent by weight of silicon, 1.3~7.8 percent by weight of tungsten silicide and the balance being silicon carbide.

* * * * *